US012609220B2

(12) United States Patent
Raju

(10) Patent No.: US 12,609,220 B2
(45) Date of Patent: Apr. 21, 2026

(54) ELECTRICAL INSULATION TUBE

(71) Applicant: Ravisekhar Raju, Clifton Park, NY (US)

(72) Inventor: Ravisekhar Raju, Clifton Park, NY (US)

( * ) Notice: Subject to any disclaimer, the term of this patent is extended or adjusted under 35 U.S.C. 154(b) by 49 days.

(21) Appl. No.: 18/582,643

(22) Filed: Feb. 20, 2024

(65) Prior Publication Data

US 2024/0282488 A1 Aug. 22, 2024

Related U.S. Application Data

(60) Provisional application No. 63/446,998, filed on Feb. 20, 2023.

(51) Int. Cl.
*H01B 17/58* (2006.01)
*H01B 17/64* (2006.01)

(52) U.S. Cl.
CPC ............. *H01B 17/58* (2013.01); *H01B 17/64* (2013.01)

(58) Field of Classification Search
CPC ....... H01B 17/58; H01B 17/64; H02G 3/0481
USPC ............................................. 174/137, 137 R
See application file for complete search history.

(56) References Cited

U.S. PATENT DOCUMENTS 3,233,036 A * 2/1966 Jachimowicz ....... H01B 7/2825 174/107
3,551,586 A * 12/1970 Wahlberg ............. H01B 13/266 174/10
3,574,016 A * 4/1971 Wahlberg ............. H01B 13/266 156/54
3,679,503 A * 7/1972 Dembiak et al. .... H01B 13/266 156/54
3,703,605 A * 11/1972 Dembiak ............... H01B 9/022 174/107
3,819,434 A * 6/1974 Dembiak ............. H01B 13/266 156/203
3,823,747 A * 7/1974 Dembiak ........... H01B 11/1016 428/188
3,829,340 A * 8/1974 Dembiak et al. ....... B29C 48/15 156/218
4,454,379 A * 6/1984 Cleveland ............ H01B 7/2825 174/106 SC
5,043,539 A * 8/1991 Connole ................ H01B 7/202 174/23 R

* cited by examiner

*Primary Examiner* — Timothy J Thompson
*Assistant Examiner* — Michael F McAllister

(57) ABSTRACT

An electrical insulating tube is provided which isolates at least one conductor placed within the tube and a second conductor or elements that are placed outside the tube. The tube comprises a first conductive coating or foil placed on the inner surface or within the insulating tube material but substantially near its inner surface with this first conductive coating or foil electrically referenced to the conductor placed within the tube. The tube optionally comprises a second conductive coating or foil placed on the outer surface or within the tube material but substantially near its outside surface with this second conductive coating or foil electrically referenced to a conductor or electrical element placed outside the tube. Several embodiments and methods to make the tube are described.

7 Claims, 7 Drawing Sheets

ELECTRICAL INSULATION TUBE

CROSS-REFERENCE TO RELATED APPLICATION

This application claims the benefit of U.S. Provisional Patent Application No. 63/446,998, filed 20 Feb. 2023, which is incorporated by reference herein in its entirety.

STATEMENT OF GOVERNMENT INTEREST

Portions of this invention were made with government support under DE-SC0020859 awarded by Office of Science, U.S. Department of Energy. The government has certain rights in the invention.

BACKGROUND

The present invention relates to an electrically insulating tube for use in electrical power systems and equipment such as transformers, machines, or power converters.

U.S. Pat. No. 11,283,363, granted to the applicant, describes the use of an electrically insulating tube with conductive or semiconductive coatings on portions of the inner and outer surfaces of the tube in the context of a high frequency link-based power conversion system. The tube is built with a high dielectric strength material such as mica and is used to electrically insulate a first conductor which is inside the tube from a second conductor which is outside the tube. These first and second conductors can have a substantial potential difference, thus leading to a large electric field between them. The conductive or semiconductive coatings on the inner and outer surfaces are electrically connected or referenced to the respective conductors inside and outside the tube to substantially confine the electric field between the conductors to the insulating material of the tube. This substantially reduces the electric field in the air in the space between the conductors and inhibits corona or partial discharge in the air, which has a lower dielectric breakdown strength than the insulating material of the tube.

Depositing the conductive or semiconductive coating on the inner surface of the insulating tube mentioned above can be a challenging step if the tube is already in a finished shape. In addition, if the tube has voids within the insulating material, partial discharge could occur within the voids and lead to deterioration of the insulation. Therefore, what is needed are techniques that overcome the above-mentioned disadvantages.

BRIEF SUMMARY OF THE INVENTION

Embodiments of the invention provide an electrical insulation tube with improved reliability and improved manufacturability. The insulating tube is used for electrical isolation between at least one conductor that is located within the tube and a second conductor or elements that are outside the tube.

In accordance with one aspect of the invention, the insulating tube is made by rolling a sheet of insulating material such as mica and wherein a conductive or semiconductive coating or metal foil is placed on a portion of the insulating sheet surface at the edge where the rolling of the sheet to form the tube begins. The afore-mentioned coating or foil has a width to cover at least one inner circumference of the tube as the sheet is rolled. This results in a conductive or semiconductive coating or foil on the inner surface of the tube.

In accordance with another aspect of the invention, a first conductive or semiconductive coating or metal foil is placed on a portion of the mica sheet to be rolled into a tube with this portion being located such that this conductive or semiconductive layer is sandwiched within the mica tube and present substantially close to the inner surface of the tube. A second conductive or semiconductive coating or metal foil is optionally placed on the outer surface of the tube or as a layer sandwiched within the tube but located substantially close to the outer surface of the tube.

In accordance with another aspect of the invention, a resistive or semiconductive coating or foil is deposited on at least a portion of one or both surfaces of an insulating sheet. The sheet is then rolled into a tube. With the coatings or foil on the one or both surfaces electrically referenced, electric field in any voids or gaps between sheets used to form the tube is reduced thus decreasing partial discharge activity and improving the reliability of the insulation.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
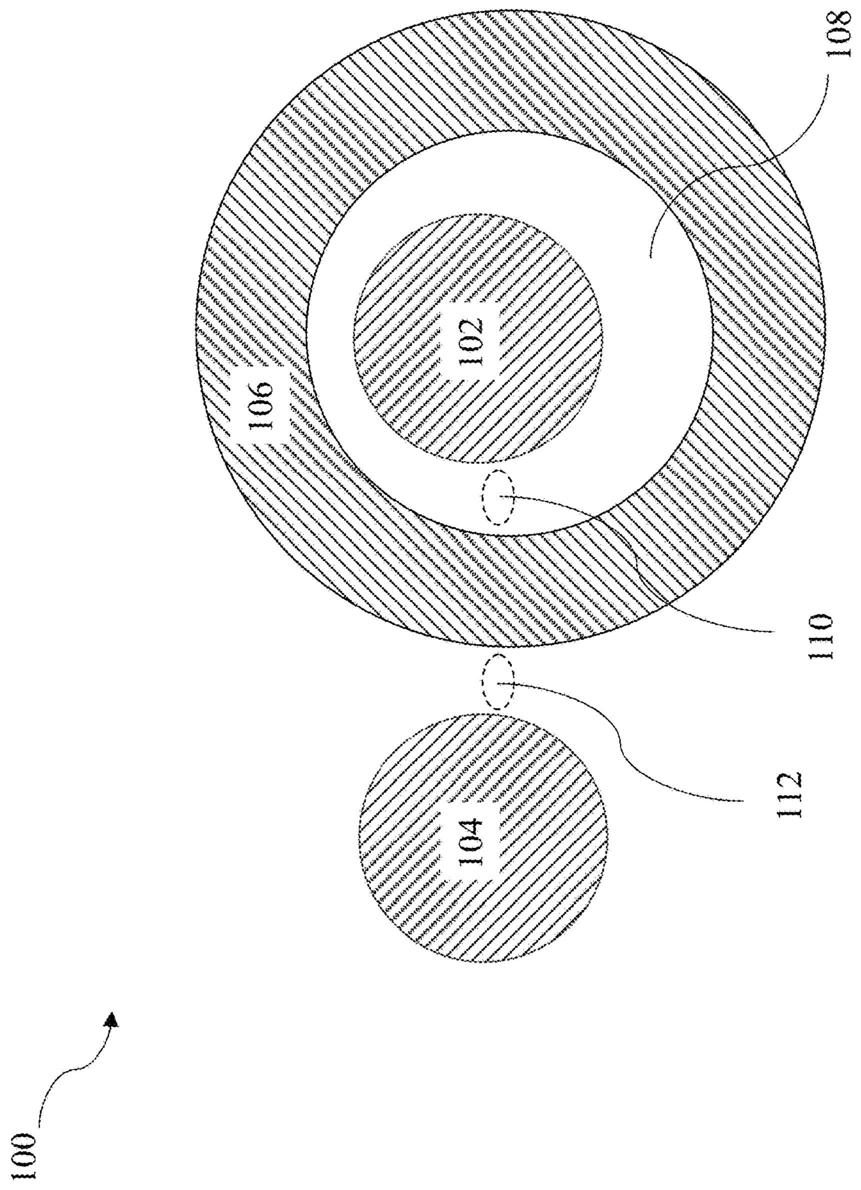
Prior Art Fig. 1
FIG. 1 illustrates an electrically insulating tube providing separation between a conductor positioned inside the tube and a conductor positioned outside the tube according to prior art.

FIG. 1 illustrates an electrical insulation system, 100, according to prior art, wherein a tube, 106, made of a material such as mica with a high dielectric stress withstand capability separates a conductor, 102, from another conductor, 104. Although the insulating material forming the tube 106 can withstand a high dielectric stress, a substantial portion of the dielectric stress gradient can appear in the air gaps, 110 and 112, and these air gaps can have corona or partial discharge leading to failure of the system.

Figure 2:
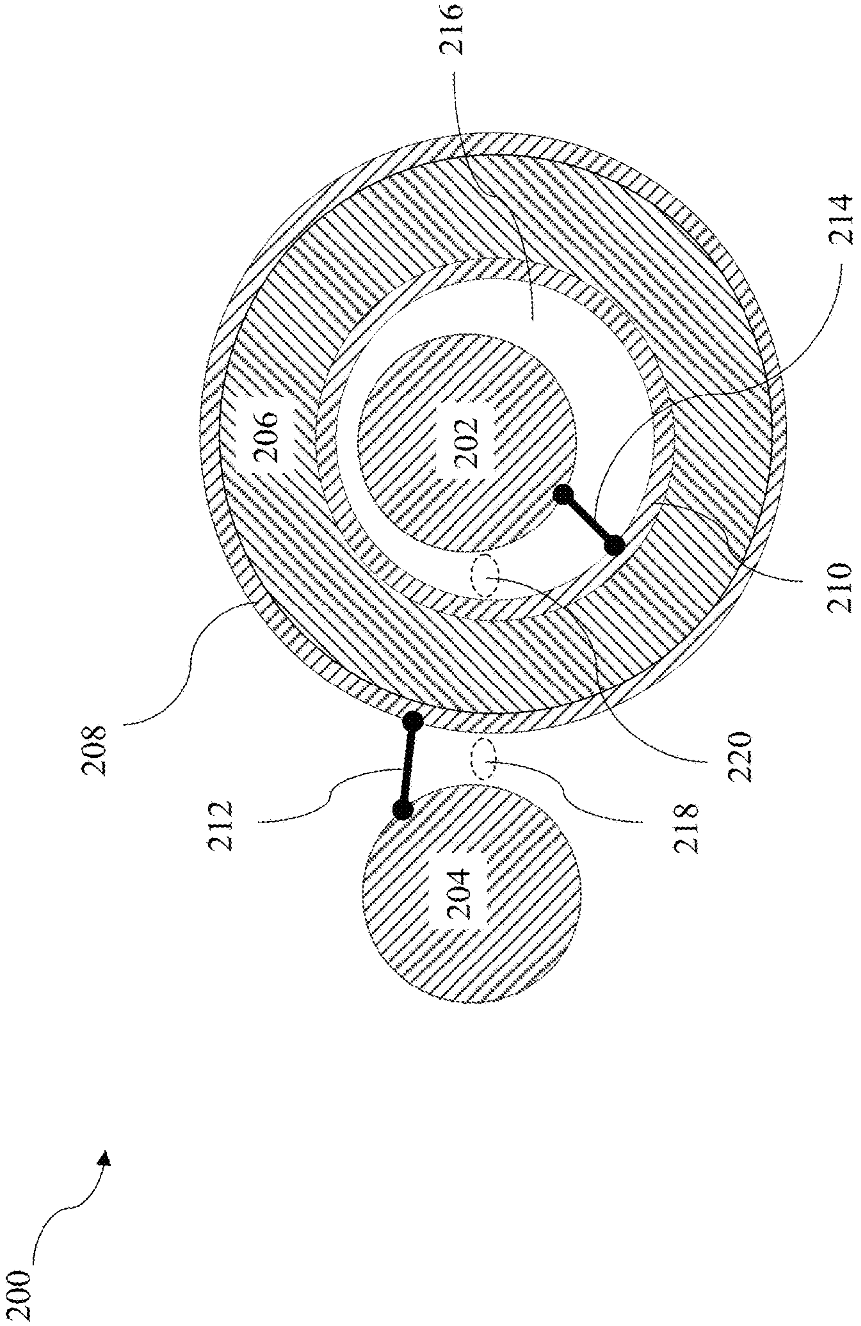
Prior Art Fig. 2
FIG. 2 illustrates an electrically insulating tube providing separation between a conductor positioned inside the tube and a conductor positioned outside the tube with the inner surfaces and outer surfaces of the tube conductively coated and referenced to the inner and outer conductors respectively according to prior art.

FIG. 2 illustrates an improved electrical insulation system, 200, according to prior art, wherein a tube, 206, made of a material such as mica with a high dielectric stress withstand capability separates a conductor, 202, from another conductor, 204. In this case, the tube 206 is provided with a first conductive or semiconductive coating or foil on the inner surface, 210, with an electrical tie, 214, to conductor 202. Further, the tube 206 is provided with a second conductive or semiconductive coating or foil on the outer surface, 208, with an electrical tie, 212, to conductor 204. This results in the voltage difference between 202 and 204 being substantially applied across the tube 206, and the air gaps 218 and 220 having substantially zero voltage. Thus partial discharge or corona is reduced.

Figure 3:
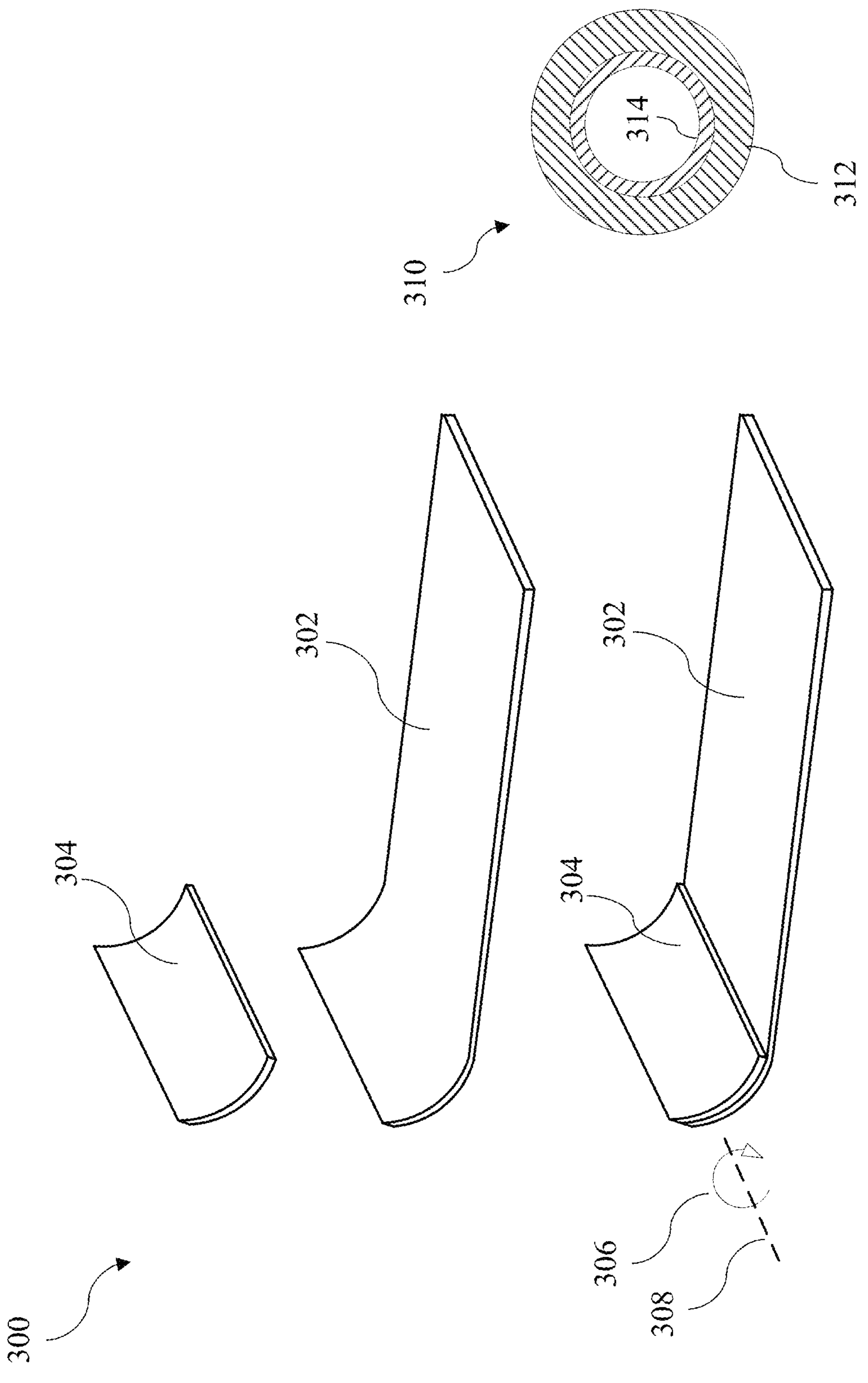
FIG. 3 illustrates a method to make the electrically insulating tube with a conductive or semiconductive coating at the starting portion of a sheet to be rolled into the tube, according to one embodiment of the present invention.

FIG. 3 illustrates a method, 300, to make an electrical insulation tube according to an embodiment of the present invention. A conductive foil, 304, of material such as aluminum, is placed on one edge of a sheet, 302, of electrical insulation material such as mica or Nomex. The combination is then rolled (306) along axis (308), to create a tube with cross-section 310, wherein the conductive foil 304 appears on the inner surface of the tube cross-section as 314 and wherein the insulating material appears in the cross-section as 312. A conductive coating could be used in place of 304 on the insulating sheet edge prior to the rolling of the sheet.

Figure 4:
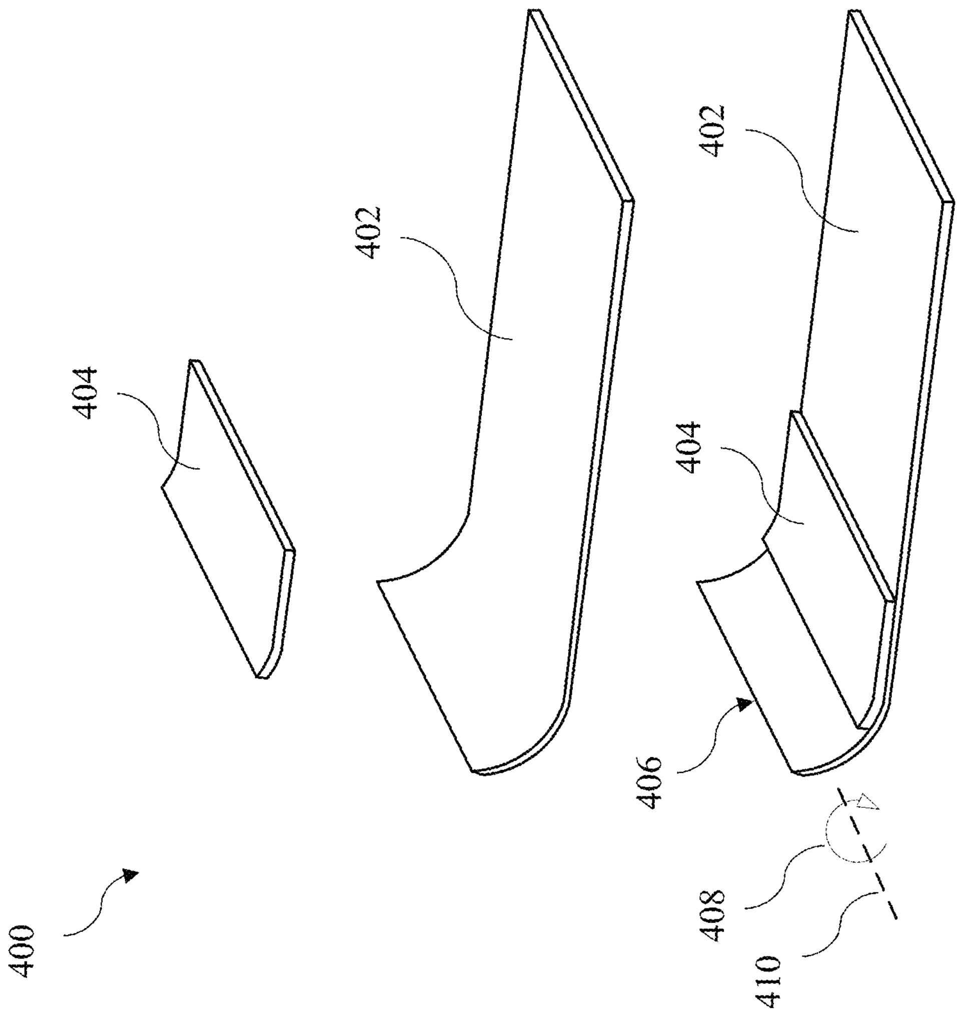
FIG. 4 illustrates a method to make the electrically insulating tube with a conductive or semiconductive coating near the starting portion of a sheet to be rolled into the tube, according to one embodiment of the present invention.

FIG. 4 illustrates a method, 400, to make an electrical insulation tube according to another embodiment of the present invention. A conductive foil, 404, of material such as aluminum, is placed near, but with some separation from one edge of a sheet, 402, of electrical insulation material such as mica or Nomex. The combination is then rolled (406) along axis (408), to create a tube. In this case, as opposed to the embodiment of FIG. 3, the conductive foil or coating will be embedded near the inner surface of the tube, but protected by a layer of the sheet 406.

Figure 5:
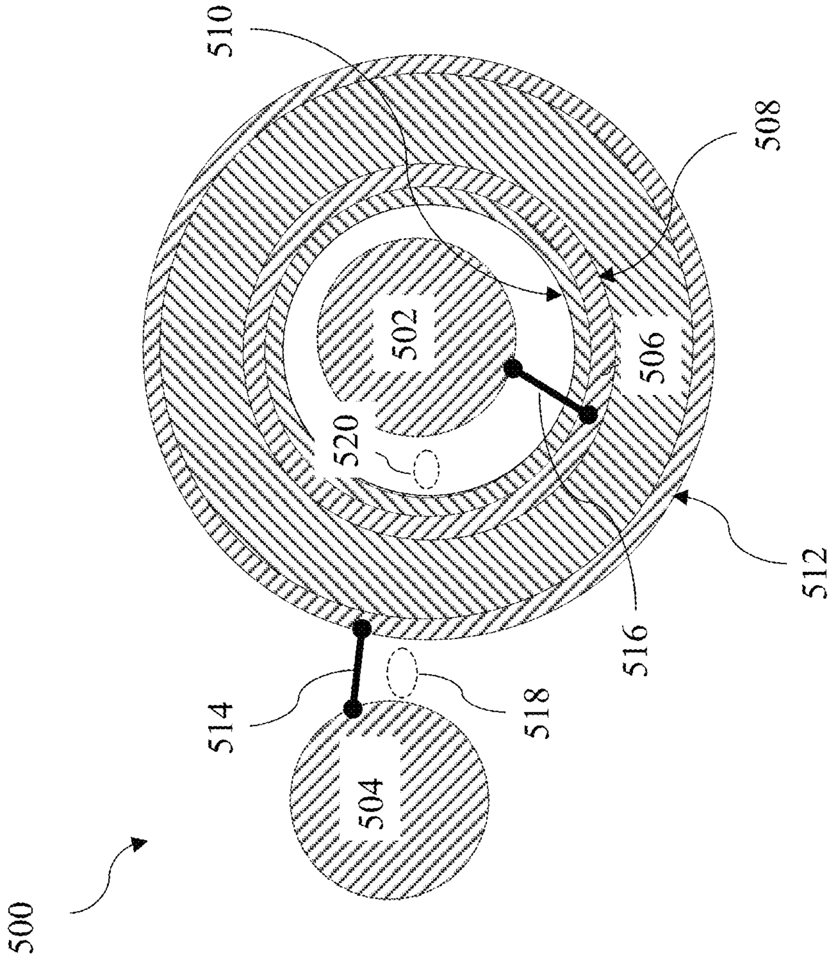
FIG. 5 illustrates a cross-section of the tube made according to the method depicted in FIG. 4, and a first conductor placed within the tube and a second conductor placed outside the tube.

FIG. 5 illustrates a cross-section of the electrical insulation system with the tube rolled according to FIG. 4. The tube comprises the insulating material 506, the conductive coating or foil, 508 and a protective insulating layer 510. A further conductive or semiconductive coating or foil, 512 is placed on the outer surface, and this is further electrically tied, 514, to a conductor 504 outside the tube. The conductive coating or foil is electrically tied, 516, to a conductor, 502, placed inside the tube. The aforementioned electrical referencing of the layers through the ties, 514 and 516, places the dielectric stress between the conductors 502 and 504 substantially across the insulating material 506, this preventing dielectric stress and breakdown in the air gaps, 518 and 520.

Figure 6:
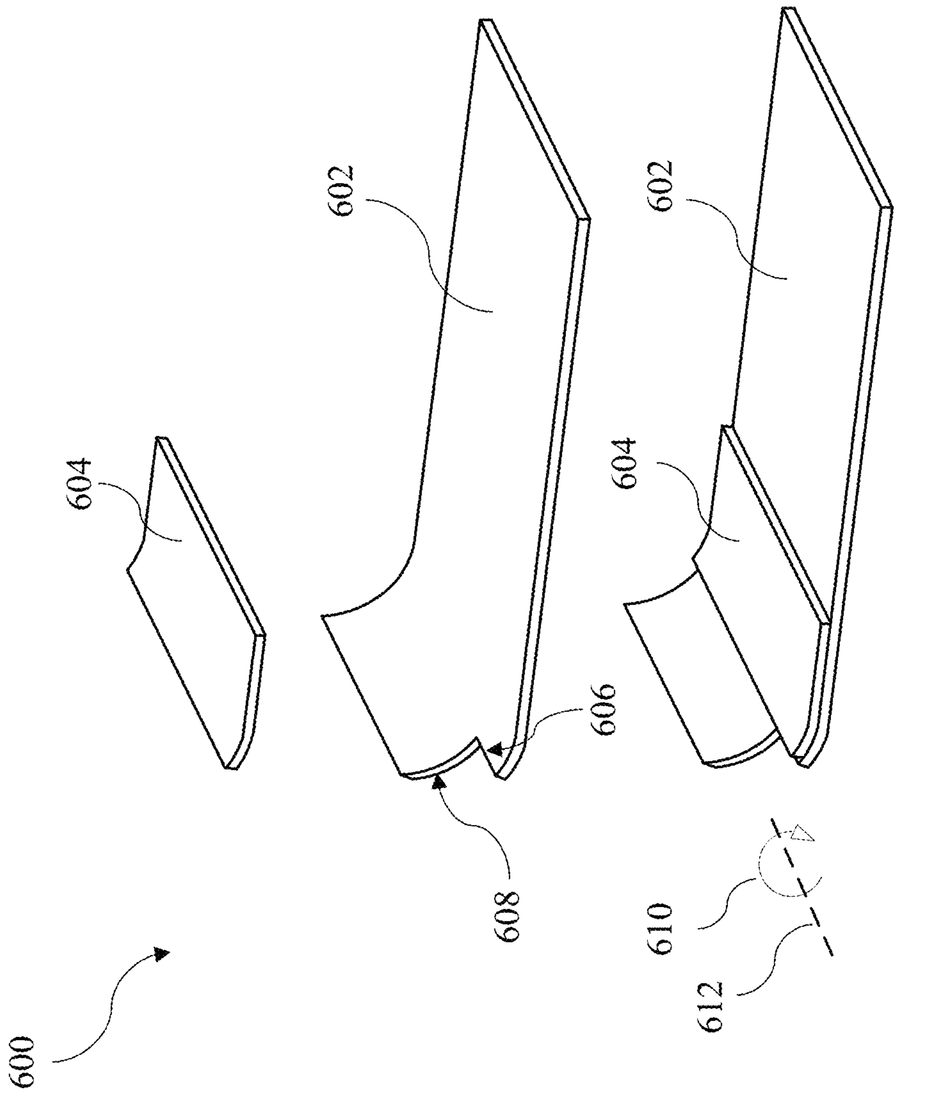
FIG. 6 illustrates, according to another embodiment of the invention, a method to make an electrically insulating tube with a conductive or semiconductive layer embedded in the tube substantially near the inner surface of the tube.

FIG. 6 illustrates a method 600 to make an electrical insulation tube according to another embodiment of the present invention. As a modification of the method shown in FIG. 4, a piece of the insulating sheet, 602 is trimmed along the edges 606 and 608. A piece of conductive foil, 604, is placed on 602, and the assembly is rolled, 610, along axis 612. An electrical insulating tube with cross-section similar to that in FIG. 5 is obtained with the difference being that the conductive foil at or near the inner surface of the tube can be more readily accessed with the method in FIG. 6.

Figure 7:
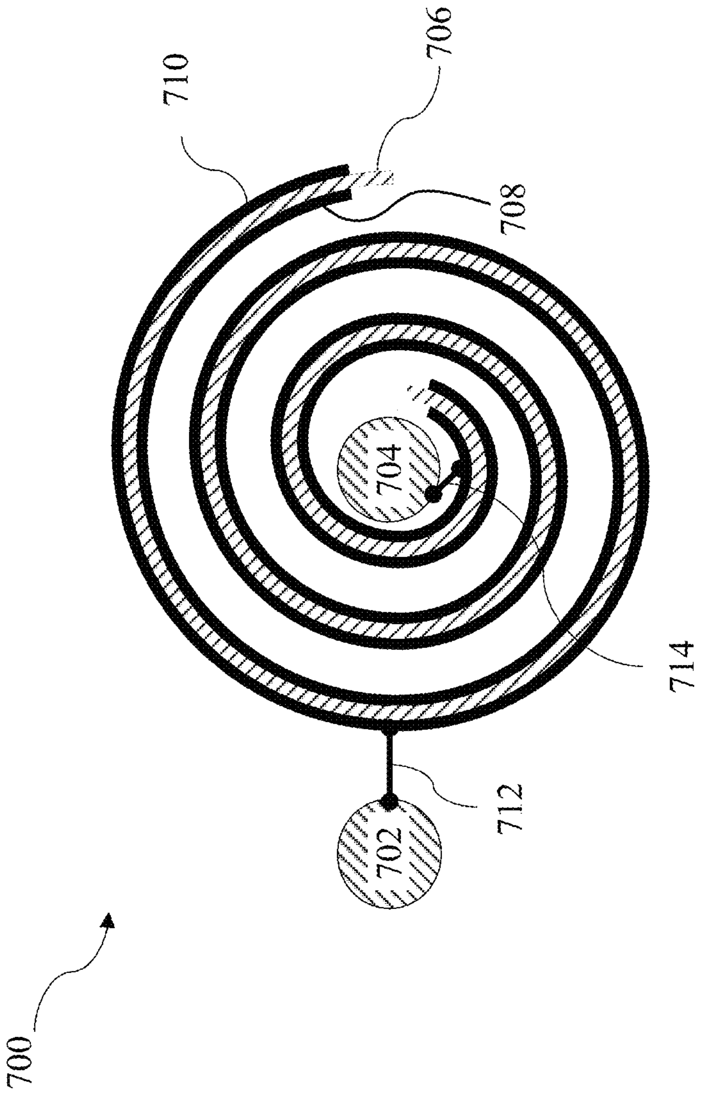
FIG. 7 illustrates, according to another embodiment of the invention, an electrically insulating tube made by rolling a sheet of electrically insulating material, wherein one or both surfaces of the sheet are coated with a semiconductive material or foil, and wherein the coated surfaces of the tube are electrically referenced to conductors placed inside or outside the tube such that partial discharge is prevented in surrounding gaps or voids.

FIG. 7 illustrates a cross-section, 700, with an electrical insulation tube separating a conductor, 704, placed within the tube from another conductor, 702, placed outside the tube. The tube comprises a sheet, 706, of electrically insulating material. Semiconductive or resistive coating or foil are placed on at least one of the surfaces of the sheet, 708 and 710. The coatings or foils, 708 and 710 is electrically tied, 714, to conductor 704 and optionally electrically tied, 712, to conductor 702. The coatings of foils, can optionally be also electrically tied to each other at one or both ends of the rolled sheet. The semiconductive or resistive coatings of foils substantially place the dielectric stress between conductors 702 and 704 across the material of the insulating sheet, 706, and reduce the stress in any voids or gaps between the layers of the rolled tube of insulating sheet, 706, thus reducing corona or partial discharge.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. An electrically insulating tube made by rolling a sheet, wherein the sheet comprises electrically insulating material, and wherein a conductive or semiconductive coating or foil is placed on a portion of the sheet at or substantially near an edge of the sheet prior to rolling, and wherein the rolling of the sheet is initiated at the said edge of the sheet such that the conductive or semiconductive coating or foil is positioned on the inner surface or substantially near the inner surface of the said tube.

2. The electrically insulating tube of claim 1, wherein the conductive or semiconductive coating or foil positioned on the inner surface or substantially near the inner surface of the tube is electrically connected or referenced to an electrical conductor positioned inside the tube thus placing the said conductive or semiconductive coating or foil at substantially the same electric potential as the said conductor.

3. The electrically insulating tube of claim 1, wherein a second conductive or semiconductive coating or foil is placed on a portion of the sheet at or substantially near an edge of the sheet where the rolling of the sheet is completed, such that the said second conductive or semiconductive coating or foil is positioned on the outer surface or substantially near the outer surface of the said tube.

4. The electrically insulating tube of claim 3, wherein the said second conductive or semiconductive coating or foil positioned on the outer surface or substantially near the outer surface of the tube is electrically connected or referenced to an electrical conductor positioned outside the tube thus placing the said coating or foil at substantially the same electric potential as the said conductor.

5. An electrically insulating tube made by rolling a sheet of electrically insulating material, wherein at least one of the two surfaces of the sheet is coated with a semiconductive material or foil, and wherein the semiconductive material or foil on or near the inner surface of the tube is electrically connected or referenced to an electrical conductor positioned inside the tube thus placing the said coating or foil on the inner surface at substantially the same electric potential as the said conductor inside the tube, and wherein the coating or foil at or near the outer surface of the tube is electrically connected or referenced to an electrical conductor positioned outside the tube thus placing the said coating or foil on the outer surface at substantially the same electric potential as the said conductor outside the tube.

6. The electrically insulating tube of claim 1, wherein the insulating tube separates a first electrical winding or conductor placed within the tube from a second electrical winding or conductor placed outside the tube.

7. The electrically insulating tube of claim 5, wherein the insulating tube separates a first electrical winding or conductor placed within the tube from a second electrical winding or conductor placed outside the tube.

* * * * *